United States Patent [19]

Ward

[11] Patent Number: 4,719,534
[45] Date of Patent: Jan. 12, 1988

[54] ELECTRIC SHOCK SAFETY DEVICE

[76] Inventor: Gary S. Ward, 7402 Hidden Creek, Dallas, Tex. 75252

[21] Appl. No.: 863,092

[22] Filed: May 14, 1986

[51] Int. Cl.$^4$ .............................................. B68B 11/00
[52] U.S. Cl. ................................................ 361/232
[58] Field of Search ...................... 248/188.5; 361/232, 361/235; 354/76

[56] References Cited

U.S. PATENT DOCUMENTS

| | | | |
|---|---|---|---|
| 1,193,168 | 8/1916 | Martin | 231/2 |
| 1,204,565 | 11/1916 | Habinski | 248/188.5 X |
| 1,411,615 | 4/1922 | Evans | 240/10.5 |
| 1,489,431 | 4/1924 | Drouillat | 240/10.5 |
| 1,956,339 | 4/1934 | Bernasconi et al. | 240/10.5 |
| 2,176,994 | 10/1939 | Hansen et al. | 231/2 |
| 2,277,897 | 3/1942 | Alexander | 240/10.5 |
| 2,484,147 | 10/1949 | Bartel | 231/2 |
| 2,733,003 | 1/1956 | Abildgaard et al. | 231/2 |
| 2,966,621 | 12/1960 | Voll | 361/235 X |
| 3,119,554 | 1/1964 | Fagan et al. | 231/2 |
| 3,211,069 | 10/1965 | Rixton | 95/11.5 |
| 3,362,711 | 1/1968 | Larsen et al. | 273/84 |
| 3,396,311 | 8/1968 | Maltner et al. | 317/81 |
| 3,484,665 | 12/1969 | Mountjoy et al. | 361/235 X |
| 3,523,538 | 8/1970 | Shimizu | 128/404 |
| 3,558,903 | 1/1971 | Yamano | 310/8.7 |
| 3,575,340 | 4/1971 | Klebold | 231/2 |
| 3,626,626 | 12/1971 | Blanc | 43/6 |
| 3,722,788 | 3/1973 | Petrecz | 231/2 E |
| 3,885,576 | 5/1975 | Symmes | 361/232 X |
| 3,987,807 | 10/1976 | Varnell | 248/188.5 X |
| 4,006,390 | 2/1977 | Levine | 361/235 |
| 4,365,881 | 12/1982 | Hazama et al. | 354/76 |

*Primary Examiner*—Donald A. Griffin
*Attorney, Agent, or Firm*—Hubbard, Thurman, Turner & Tucker

[57] ABSTRACT

An electric shock safety device is disclosed. The electric shock safety device has an extending or telescoping probe which provides a means for the safe, efficient, rapid and accurate deployment of the device. The device is especially suited for protection for joggers and bicyclists from menacing dogs or other animals.

16 Claims, 6 Drawing Figures

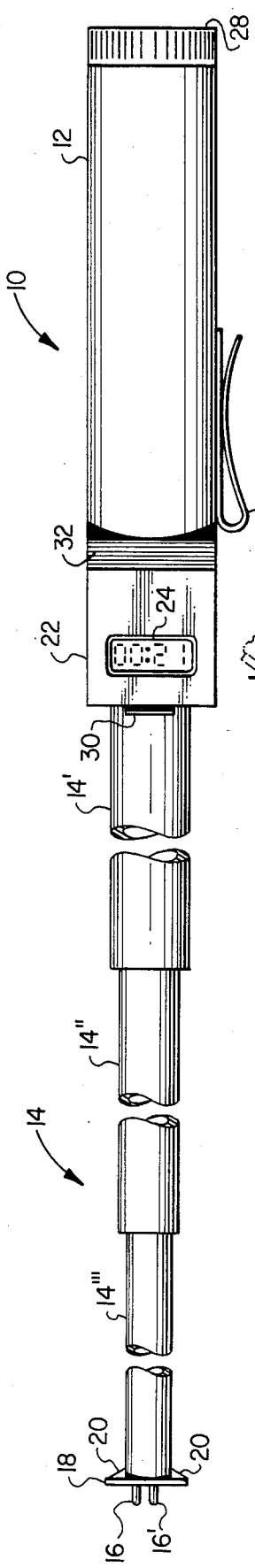
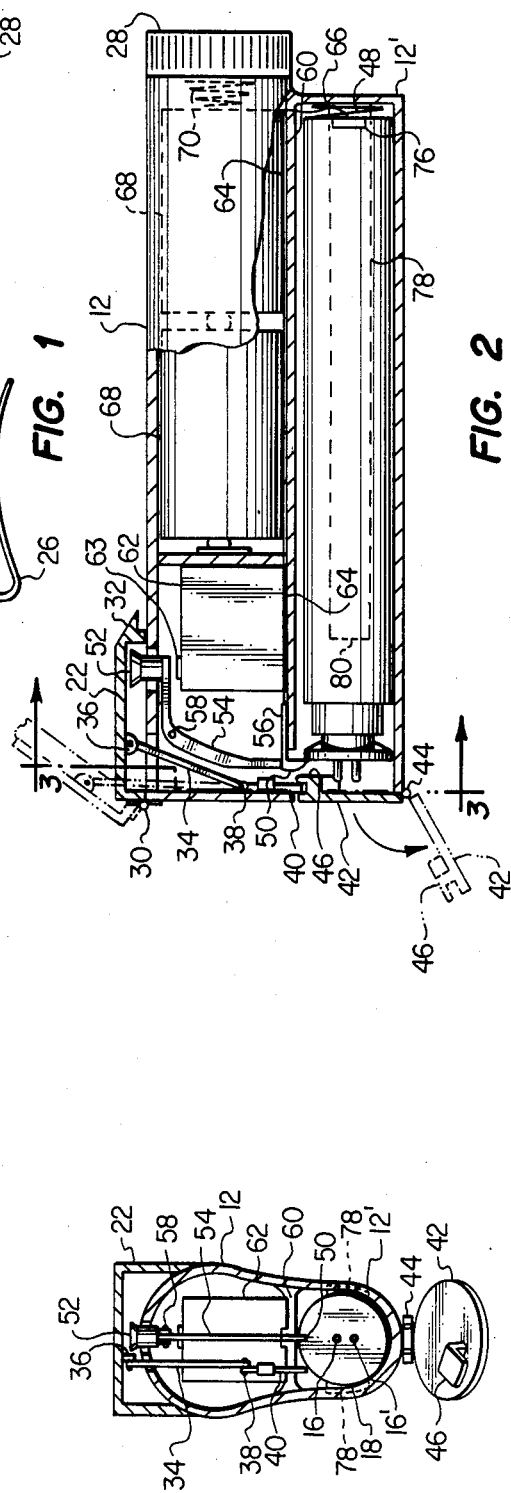
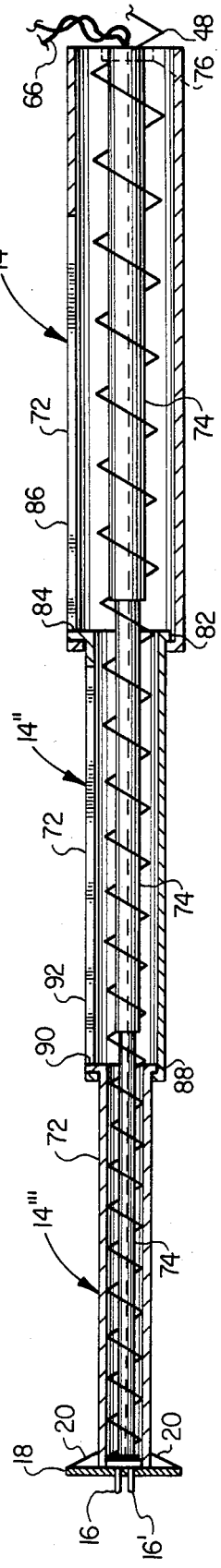

ELECTRIC SHOCK SAFETY DEVICE

BACKGROUND OF THE INVENTION

1. Field of the Invention

The present invention relates to an electric shock safety device having an extending or telescoping probe that produces an electrical shocking potential.

2. Description of the Prior Art

It is well known in the art to provide electrical shocking devices in the form of a cattle prod (U.S. Pat. Nos. 1,193,168; 2,176,994; 2,484,147; 2,733,003; and 3,575,340), policeman's billy club (U.S. Pat. No. 3,362,711), electrified postman's stick (U.S. Pat. No. 3,119,554), electrified spear and electrified projectile.

It is also known in the art to provide an electric shock device which has telescoping prods that are similar to small radio antenna which can be extended by hand to a desired length as disclosed in U.S. Pat. No. 3,722,788.

It is further known in the art to provide a pocket-sized miniature electrified weapon having an extendible and retractable prod carrying its high voltage contacts as disclosed in U.S. Pat. No. 4,006,390.

None of these prior art devices, however, provide an adequate means to quickly ward off humans, dogs, or other animals from a relatively safe distance. More specifically, none of these prior art devices are useful for warding off dogs or other animals that attack or run after a bicyclist or jogger. It is a familiar problem for bicyclists and joggers to have to ward off or avoid such menacing dogs. Such dogs have been known to startle and disrupt many bicyclists and joggers sometimes causing them to fall down and suffer injury. There is, therefore, a need in the art to provide a device that can be quickly and easily deployed by a bicyclist or jogger for shocking and warding off dogs or other animals. Such a device is required to be convenient to carry while at the same time being effective from a distance of two to three feet so that a bicyclist or jogger can deploy the device from a safe distance.

The prior art devices noted above suffer from the drawback and disadvantage that they are not easily deployed from a bicycle or while jogging since they all require rather close range deployment or careful aim. Such devices, therefore, are not adequate for bicyclists or joggers to ward off or otherwise scare menacing dogs or other animals.

SUMMARY OF THE INVENTION

The present invention is directed to an electric shock safety device having an extending or telescoping probe that avoids the above-mentioned disadvantages which are characteristic of the prior art. More specifically, the electric shock safety device of the present invention has an extending or telescoping probe which provides a means for the safe, efficient, rapid and accurate deployment of the device.

The electric shock safety device of the present invention is formed of a housing with a telescoping probe extending from one end thereof. A pair of electrodes for delivering a nonlethal shocking potential are disposed at the end of the telescoping probe. The housing and the telescoping probe are constructed so that the probe may be retracted within the housing when not in use and quickly released from the housing to a fully extended position when use of the device is desired. When the probe is retracted within the housing, the device is compact and easy to carry such as by a bicyclist or jogger. When the probe is released to its fully extended position, the device may easily be used to ward off a dog or other animal from a safe distance without upsetting the user's rhythm and without the risk of user injury. Various safety measures are provided to ensure that the probe is released and the electrodes are energized only when use of the device in the intended manner is desired.

BRIEF DESCRIPTION OF THE DRAWINGS

In describing the device of the present invention, reference will be made to the accompanying drawings in which:

FIG. 1 is a top plan partially fragmentary view of the electric shock safety device of the present invention with the probe in extended position;

FIG. 2 is a left side sectional view of the electric shock safety device of the present invention with the probe in retracted position;

FIG. 3A is a sectional view taken down line 3—3 of FIG. 2;

FIG. 4 is a detail sectional view of the probe of the electric shock safety device of the present invention in extended position.

DETAILED DESCRIPTION OF THE PREFERRED EMBODIMENTS

Figure 3B:
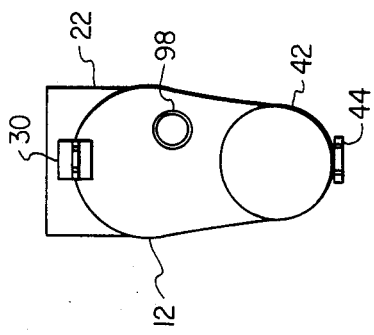
FIG. 3B is a front view of the electric shock safety device of the present invention with the probe in retracted position.

As shown in FIG. 1, the electric shock safety device according to the present invention generally depicted at 10 includes a housing 12 with a telescoping probe 14 extending from one end thereof. The housing 12 is preferably made of high impact plastic. The telescoping probe is preferably constructed to have three sections, 14', 14" and 14'". In its fully extended position, the telescoping probe preferably extends from the housing 12 for a length of from 2 to 3 feet. It will be apparent to one skilled in the art, however, that the length of the probe and the number of probe sections may be varied as desired. The outside diameter of probe section 14" is smaller than the inside diameter of probe section 14' and the outside diameter of probe section 14'" is smaller than the inside diameter of probe section 14". Accordingly, and as shown in FIG. 2, probe section 14" is dis-posed within probe section 14' and probe section 14'" is disposed within probe section 14" when the probe 14 is in its retracted position.

A pair of electrodes 16, 16' are disposed at the end 18 of the telescoping probe 14 and extend from probe section 14'". The electrodes 16, 16' are preferably made of brass or copper. As shown in FIG. 1, the end 18 of the telescoping probe 14 is larger in diameter than probe section 14'". As explained more fully and in detail below, support 20 is disposed within the triangular area between the outer diameter of end 18 and probe section 14'". Also as explained more fully and in detail below, the telescoping probe 14, is retracted and disposed within lower portion 12' of housing 12 when not in use and is adapted to be extended to its full telescoping position as shown in FIG. 1 when it is desired to use the device and ward off an attacking or menacing dog or other animal.

A flip-up device 22, the function of which is explained more fully and in detail below, is provided on housing 12. The flip-up device 22 preferably has a stopwatch, pacer or other similar electronic device 24 incorporated therein to provide a bicyclist or jogger with a ready means to monitor his activity.

A clip 26 is preferably provided on housing 12 to provide a means for storing the device on one's body when not in use and to provide ready and rapid access to the device should its use become desired. As those skilled in the art will recognize, the clip 26 may also be of a type conventional in the art that is attachable to the frame of a bicycle.

A screw-on cap 28 is provided at the end of the housing 12 opposite probe 14. The function of the screw-on cap 28 is explained more fully and in detail below.

As shown in FIGS. 2 and 3B, the flip-up device 22 is attached to housing 12 by means of a spring hinge 30. The flip-up device 22 is provided with a protrusion 32 which enables a user to raise upwardly the flip-up device 22 as shown by dotted lines in FIG. 2. When the flip-up device 22 is raised upwardly by means of protrusion 32, flip-up arm 34 pivots about pivot point 36 and pivot point 38 thus moving the telescope safety cover release arm 40 upwardly and away from telescope safety cover 42. Telescope safety cover 42 is attached to the lower portion 12' of housing 12 by means of a spring loaded hinge 44. Telescope safety cover 42 is provided on its rear surface with a latch 46. As shown in FIG. 2, latch 46 cooperates with telescope safety cover release arm 40 so that telescope safety cover 42 is released when telescope safety cover release arm 40 is moved upwardly. When telescope safety cover 42 is released, spring-loaded hinge 44 urges telescope safety cover 42 until it comes to rest in the position shown in FIG. 3A and the position shown by dotted lines in FIG. 2.

As shown in FIG. 2, probe 14 may be retracted and stored within lower portion 12' of housing 12 when not in use. As explained more fully and in detail below, probe 14 is urged toward telescope safety cover 42 by means of an extension spring 48. Also, as explained more fully and in detail below, probe 14 is prevented from exerting force against telescope safety cover 42 by means of telescope release latch 50.

When flip-up device 22 is raised upwardly and telescope safety cover 42 is released, combination release and energizer button 52 is exposed. The combination release and energizer button 52 is preferably made out of high impact plastic. The combination release and energizer button 52 is attached to telescope release arm 54. Telescope release arm 54 is made of conducting material. When combination release and energizer button 52 is depressed, telescope release arm 54 pivots about pivot point 58 thus exerting upward force on telescope release latch 50. Telescope release latch 50 is prevented from moving laterally toward telescope safety cover 42 by latch arm 56 which is rigidly connected to a divider 60 between housing 12 and lower housing portion 12'. Latch arm 56 is made of conductive material and is, preferably, made of spring steel so that when combination release and energizer button 52 is released, telescope release latch 50 will return to the position shown in FIG. 2. When telescope release latch 50 is raised upwardly, probe 14 is released and subsequently urged to its full telescoping position as shown in FIG. 1 by extension spring 48. Extension spring 48 is preferably made of spring steel.

Electrodes 16, 16', disposed at the end 18 of probe 14, are energized when the combination release and energizer button 52 is depressed. Electric potential is delivered to electrodes 16, 16' from a high voltage power supply 62 in the following manner. When combination release and energizer button 52 is depressed, telescope release arm 54 contacts a hotspot 63 in the high voltage power supply 62. Electric potential from the high voltage power supply 62 flows from hotspot 63 into and travels the length of telescope release arm 54. The electric potential then flows into and travels the length of latch arm 56. From latch arm 56, the electric potential enters and flows through conductive wire or metal strip 64. The electric potential then enters wire 66 which is electrically connected to electrodes 16, 16'. Wire 66 is preferably made of insulated two-strand coiled copper wire that is similar to telephone-type receiver wire that may easily uncoil to accommodate the full extension of probe 14 while maintaining its electrical connection with wire or metal strip 64. Alternatively, wire 66 may comprise a spring loaded spool or coil of wire that unwinds to accommodate the full extension of probe 14 and rewinds when probe 14 is retracted within the lower portion 12' of housing 12.

High voltage power generators for producing shocking voltages up to 50,000 volts or greater with low current output, as may be used for high voltage power supply 62, are well known to those skilled in the art and are available on the open commercial market. A typical battery operated electrical shock current generator employing a circuit breaking vibrator and high ratio step-up transformer is shown in FIG. 2 of U.S. Pat. No. 3,523,538, the disclosure of which is hereby incorporated by reference. A typical battery operated electronic circuit for this same purpose is shown in FIG. 2 of U.S. Pat. No. 3,626,626, the disclosure of which is hereby incorporated by reference.

Although a battery operated power supply of this type is preferred, alternative self-powered miniature electrical high voltage generators are also available and may be employed for this purpose. For example, hand pumped piezo-electric generators are available for generating high voltages as described in U.S. Pat. No. 3,211,069, the disclosure of which is hereby incorporated by reference. Similarly, U.S. Pat. No. 3,558,903, the disclosure of which is hereby incorporated by reference, discloses a ceramic piezo-electric generator provided with a hand lever operated activator mechanism, and U.S. Pat. No. 3,396,311, the disclosure of which is hereby incorporated by reference, shows a similar hand operated piezo-electric voltage generator used to produce high voltage sparks for igniter purposes.

If desired, more conventional miniature selfpowered electromotive generators may be employed. These have been available for many years for powering "batteryless flashlights" as disclosed in U.S. Pat. Nos. 2,277,897; 1,956,339; 1,489,431; and 1,411,615, the disclosures of which are hereby incorporated by reference. These hand held electromotive generators use windup springs to rapidly rotate small rotors, or alternatively employ levers or gear drives that enable the user to repetitively squeeze a lever to rotate a rotor at high speed in a magnetic field. These self-powering magnetomotive generators when combined with a high voltage step-up transformer may be employed to produce a very high voltage shocking potential useful in the practice of the present invention.

As noted above, a battery operated power supply is preferred according to the present invention. For this purpose, as shown in FIG. 2, a plurality of batteries 68 are provided within housing 12. Batteries 68 are in electrical contact with high voltage power supply 62. While two C-cell batteries are shown in FIG. 2, those skilled in the art will recognize that additional or different-sized batteries may be utilized to supply power to high voltage power supply 62. As mentioned previously, a screw-on cap 28 is provided at the end of housing 12 opposite probe 14. Screw-on cap 28 operates to maintain the plurality of bataeries 68 in electrical contact with high voltage power supply 62. Screw-on cap 28 is preferably provided with a spring 70, as shown in FIG. 2, to aid in maintaining the plurality of batteries 68 in electrical contact with high voltage power supply 62.

As shown in FIG. 4, probe sections 14', 14'', 14''' each have a protective outer sleeve 72 that is preferably made of material such as aluminum or steel. The protective outer sleeve 72 of each probe section encases a corresponding protective inner sleeve 74 which houses wire 66. Each protective inner sleeve 74 is preferably made of high impact plastic. Extension spring 48 surrounds the protective inner sleeve 74 of each probe section and urges an extending force on end 18 of probe 14.

To prevent probe 14 from separating from housing 12 by the force exerted by extension spring 48, an ear and slot system is provided as described below. As shown in FIGS. 2 and 4, an ear 76 is provided at circumferentially opposite positions on probe section 14'. As shown in FIGS. 2 and 3A, a slot 78 is cut in either side of the lower portion 12' of housing 12 to accommodate a corresponding ear 76 on probe section 14'. When the probe 14 is released from lower portion 12' of housing 12 under the action of extension spring 48, each ear 76 travels from the position shown in FIG. 2 to the farthest end 80 of each slot 78 to provide for full extension of probe 14. By providing two circumferentially opposite cooperating ear 76 and slot 78 systems, probe section 14' is prevented from rotating or becoming skewed with respect to the lower portion 12' of housing 12. Also, the two circumferentially opposite cooperating ear 76 and slot 78 systems prevent probe section 14' from separating from lower portion 12' of housing 12.

A similar ear and slot system is provided to prevent probe sections 14'' and 14''' from rotating with respect to each other, probe section 14' and the lower portion 12' of housing 12. As shown in FIG. 4, one end of probe section 14' and one end of probe section 14'' are formed to have an annular interlocking flange structure 82. The interlocking flange structure 82 prevents probe section 14'' from separating from probe section 14' when probe 14 is extended by extension spring 48. To prevent probe section 14'' from rotating with respect to probe section 14', an ear 84 is provided at one end of probe section 14''. Ear 84 cooperates with a corresponding slot 86 cut in the inside of the protective outer sleeve 72 of probe section 14'. Also as shown in FIG. 4, one end of probe section 14'' and one end of probe section 14''' are formed to have an annular interlocking flange structure 88. The interlocking flange structure 88 prevents probe section 14''' from separating from probe section 14'' when probe 14 is extended by extension spring 48. To prevent probe section 14''' from rotating with respect to probe section 14'', an ear 90 is provided at one end of probe section 14'''. Ear 90 cooperates with a corresponding slot 92 cut in the inside of the protective outer sleeve 72 of probe section 14''.

Once probe 14 has been release from the lower portion 12' of housing 12 and the dog or other animal has been warded off, the user of the device will desire to retract probe 14 and stored it within the lower portion 12' of housing 12. To accomplish this objective, the user exerts force against end 18 of probe 14 to counteract the action of extension spring 48. Ear 90 of probe section 14''' slides within slot 92 of probe section 14'', ear 84 of probe section 14'' slides within slot 86 of probe section 14' and ears 76 of probe section 14' slide within slots 78 in the lower portion 12' of housing 12 until probe 14 is retracted within lower portion 12' of housing 12. When probe 14 is almost fully retracted within lower portion 12' of housing 12, support 20 contacts telescope release latch 50. Support 20, which may be annular or a single wedge shaped piece, is constructed so that telescope release latch 50 will move upwardly as support 20 is urged further within the lower portion 12' of housing 12. Eventually, telescope release latch 50 will pass over end 18 of probe 14 and will capture and hold probe 14 in the position shown in FIG. 2 until combination release and energizer button 52 is once again depressed. To complete the operation of storing probe 14 with the lower protion 12' of housing 12, telescope safety cover 42 and flip-up device 22 are both manually returned to the position shown in FIG. 2 so that telescope safety cover release arm 40 engages latch 46. The device is now ready for use or may be stored safety without any danger of accidental shocking.

Figure 5:
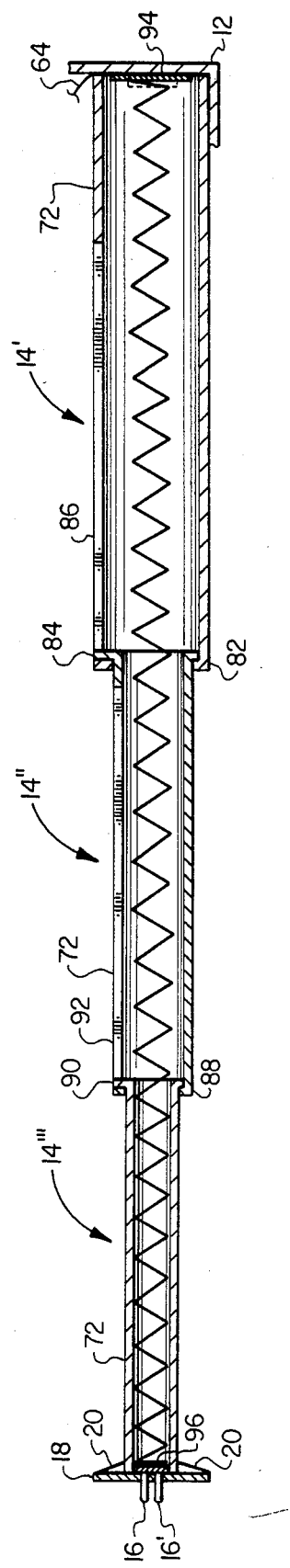
FIG. 5 is a detail sectional view of an alternate probe of the electric shock safety device of the present invention in extened position.

In an alternative and preferred embodiment of the present invention, a probe as depicted in FIG. 5 is utilized. In FIG. 5, probe sections 14', 14'' and 14''' each have a protective outer sleeve 72. The protective outer sleeve 72 of each probe section encases an extension spring 48. In the embodiment shown in FIG. 5, extension spring 48 is made of a conductive material and extends from hot spot 94 to hot spot 96. Hot spot 94 is connected to and receives electric potential from wire or metal strip 64 while hot spot 96 delivers electric potential to and energizes electrodes 16, 16'. The probe shown in FIG. 5 is provided with the corresponding ear 76 and slot 78 system, the interlocking flange structures 82 and 88, the cooperating ear 84 and slot 86 system, and the cooperating ear 90 and slot 92 system which prevent the probe 14 or any of probe sections 14', 14'' or 14''' from separating from or rotating with respect to each other or the lower portion 12' of housing 12.

In another preferred embodiment of the present invention, and as shown in FIG. 3B, a bulb 98 may be provided on the front of housing 12. Bulb 98 is electrically connected to high voltage power supply 62. In this embodiment, when combination release and energizer button 52 is depressed, bulb 98 is energized. Bulb 98 provides a source of light for the user of the device to see the target being shocked as well as to ensure that electrodes 16, 16' hit the desired target. This preferred embodiment is obviously most useful for nighttime use of the device.

In all embodiments of the present invention, the hinges, arms, latches and other various items of hardware that are not required to be made from conductive materials may be made from high impact plastic, aluminum or steel. Those skilled in the art, however, will recognize that these parts may be made from any suitable material.

While the present invention has been described in detail and with reference to specific examples thereof, it will be apparent to one skilled in the art that various changes and modifications can be made therein without departing from the spirit and scope thereof.

What is claimed is:

1. An electric shock safety device comprising:
   (a) a housing;
   (b) a telescoping probe disposed within said housing, said telescoping probe having a first and second electrode disposed at one end thereof;
   (c) a high voltage power supply disposed within said housing, said high voltage power supply being electrically connected to said first and second electrode; and
   (d) means for releasing said telescoping probe from said housing whereby said telescoping probe is extended by an extension spring;
   wherein said means for releasing said telescoping probe from said housing comprises a spring loaded safety cover and a release latch, said release latch being connected to a release arm and a conductive strip, said release arm being connected to a release and energizer button, and said conductive strip being connected to an extendible wire which is connected to said first and second electrode,
   and wherein said release arm is electrically engaged with said high voltage power supply when said release and energizer button is depressed, whereby electric potential from said high voltage power supply flows through said release arm, said release latch, said conductive strip and said extensible wire to supply high voltage power to said first and second electrode.

2. An electric shock safety device, comprising:
   (a) a housing;
   (b) probe means carried by said housing for movement between retracted and extended positions;
   (c) energizing means for utilizing a power source to energize said probe means to create an electrical shock charge therein;
   (d) a single activating means selectively operable to both move said probe means to said extended position and to activate said energizing means.

3. An electric shock safety device according to claim 2, wherein said probe means comprise a telescoping first, second and third section.

4. An electric shock safety device according to claim 3, wherein the inside diameter of said first section is larger than the outside diameter of said second section and the inside diameter of said second section is larger than the outside diameter of said third section, said third section being adjacent a first and second electrode.

5. An electric shock safety device according to claim 4, wherein the diameter of the end of said third section adjacent sais first and second electrode is larger than the outside diameter of said third section and said second section.

6. An electric shock safety device according to claim 4, wherein said first section comprises a first and second ear and said housing comprises a first and second slot, said first ear and said first slot, and said second ear and said second slot cooperating to prevent said first section from rotating with respect to said housing.

7. An electric shock safety device according to claim 6, wherein said second section comprises an ear and said first section comprises a slot, said ear and said slot cooperating to prevent said second section from rotating with respect to said first section.

8. An electric shock safety device according to claim 7, wherein said third section comprises an ear and said second section comprises a slot, said ear and said slot cooperating to prevent said third section from rotating with respect to said scond section.

9. An electric shock safety device according to claim 2, further comprising a lightbulb, said lightbulb utilizing said power source.

10. An electric shock safety device according to claim 2, wherein said power source is battery powered.

11. An electric shock safety device according to claim 2, wherein said housing comprises a stopwatch, pacer, or other similar electronic device.

12. An electric shock safety device according to claim 2, further comprising a clip to attach said device to the body of a user of said device.

13. An electric shock safety device according to claim 2, wherein said probe means comprise a first and second electrode disposed at one end thereof, said first and second electrode beiing electrically connected to said energizing means.

14. An electric shock safety device according to claim 13, wherein said energizing means comprises an extendible wire.

15. An electric shock safety device according to claim 13, wherein said energizing means comprises an extension spring.

16. An electric shock safety device according to claim 2, wherein said probe means is moved to said extended position by an extension spring.

* * * * *